Figure 1:
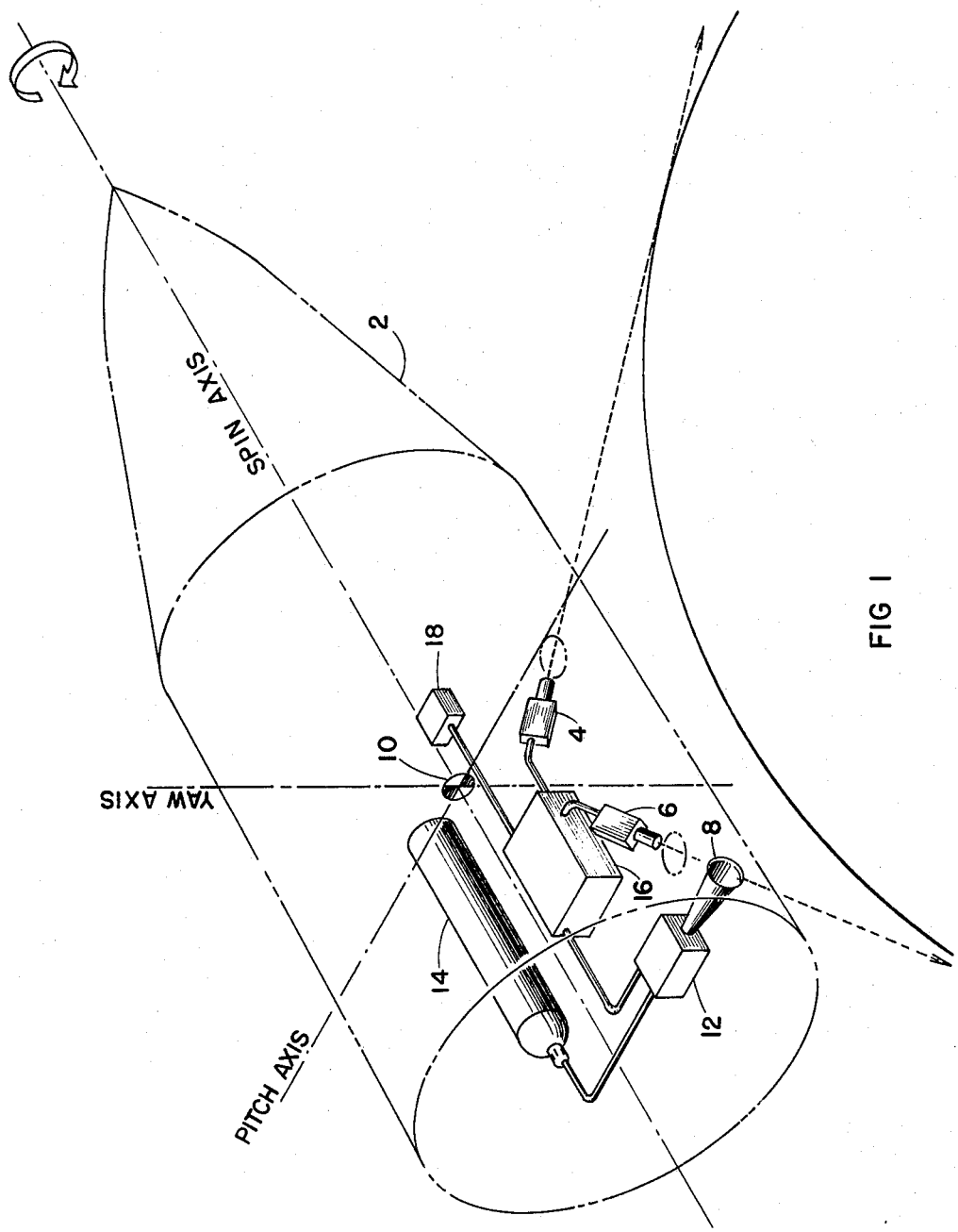

May 21, 1968

H. D. GILBERT ET AL 3,384,323

ATTITUDE AND CONING CONTROL SYSTEM
FOR SPIN-STABILIZED VEHICLES

Filed Sept. 27, 1965

2 Sheets-Sheet 1

INVENTORS
HAROLD D. GILBERT
EUGENE HARRISON

BY Robert M. Sperry

ATTORNEY

INVENTOR
HAROLD D. GILBERT
EUGENE HARRISON

United States Patent Office 3,384,323
Patented May 21, 1968

3,384,323
ATTITUDE AND CONING CONTROL SYSTEM
FOR SPIN-STABILIZED VEHICLES
Harold D. Gilbert, Dallas, Tex., and Eugene Harrison, Atlanta, Ga., assignors to LTV Aerospace Corporation, Dallas, Tex., a corporation of Delaware
Filed Sept. 27, 1965, Ser. No. 490,206
4 Claims. (Cl. 244—1)

This invention relates to attitude control systems and is particularly directed to systems for controlling the attitude and coning of spin-stabilized vehicles.

One of the major problems encountered in the development of spin-stabilized vehicles has been the problem of attitude control. The need for controlling pitch and yaw is obvious to anyone even remotely familiar with any type of aircraft. Moreover, external forces and attempts to alter pitch or yaw cause gyroscopic precession which results in an undesirable coning motion of such vehicles about the thrust axis of their flight path. Numerous systems have been proposed heretofore for controlling the attitude of spin-stabilized vehicles. However, most of the prior art systems have been directed to control pitch and yaw attitude without regard to coning, or to control coning independently of pitch and yaw. Thus, it has been necessary heretofore to provide two independent, and often conflicting, systems in order to provide complete attitude control. Obviously, this requirement greatly increases the cost, weight, and bulk of such vehicles, reduces the space available for payload, and increases the propulsion requirements of such vehicles.

These disadvantages of the prior art are overcome with the present invention and an attitude control system is provided which simultaneously controls pitch, and coning without introducing yaw errors. Moreover, the system of the present invention is economical, compact, light in weight, and is not substantially more complex than prior art systems which have controlled only pitch and yaw attitude.

The advantages of the present invention are preferably attained by providing an attitude control system for spin-stabilized vehicles having a pair of horizon sensors controlling a radially directed reaction device for effecting changes in pitch attitude, together with means for determining whether firing of the reaction device at a given time will increase or decrease coning motion and to permit firing of the reaction device only during intervals in which such firing will tend to reduce coning.

Accordingly, it is an object of the present invention to provide an improved attitude control system for spin-stabilized vehicles.

Another object of the present invention is to provide an attitude control system for spin-stabilized vehicles which simultaneously controls pitch and coning of said vehicle without introducing yaw errors.

A further object of the present invention is to provide an attitude control system for spin-stabilized vehicles which simultaneously controls the pitch and coning attitudes of a spin-stabilized vehicle, yet is compact, light in weight, and less complex than a plurality of independent systems.

A specific object of the present invention is to provide an attitude control system for spin-stabilized vehicles comprising a pair of horizon sensors, a radially directed reaction device controlled by said sensors for effecting changes in pitch attitudes, means for determining whether firing of said reaction device at a given time will increase or decrease coning of said vehicle, and means for permitting firing of said reaction device only during intervals in which such firing will reduce coning of said vehicle.

These and other objects and features of the present invention will be apparent from the following detailed description taken with reference to the figures of the accompanying drawing.

In the drawing:
FIGURE 1 is a diagrammatic representation of a spin-stabilized vehicle embodying the attitude control system of present invention; and
FIGURE 2 is a block diagram of the attitude control system of the vehicle in FIG. 1.

In that form of the present invention chosen for purposes of illustration in the drawing, FIG. 1 shows a spin-stabilized vehicle 2 having two co-planar, laterally directed horizon scanners 4 and 6, respectively canted fore and aft.

A radially directed jet nozzle 8, or other reaction device is mounted on the vehicle 2 at a location longitudinally displaced from the center of gravity of the vehicle 2, indicated at 10, and displaced approximately 90 degrees in roll from the plane of the scanners 4 and 6. A valve 12 regulates connection of the nozzle 8 to source 14 of compressed gas of the like, and valve 12 is controlled by a logic circuit 16 in response to signals from scanners 4 and 6 and from a rate gyroscope 18 which indicates the rate of coning of the vehicle 2 about its thrust axis.

Figure 2:
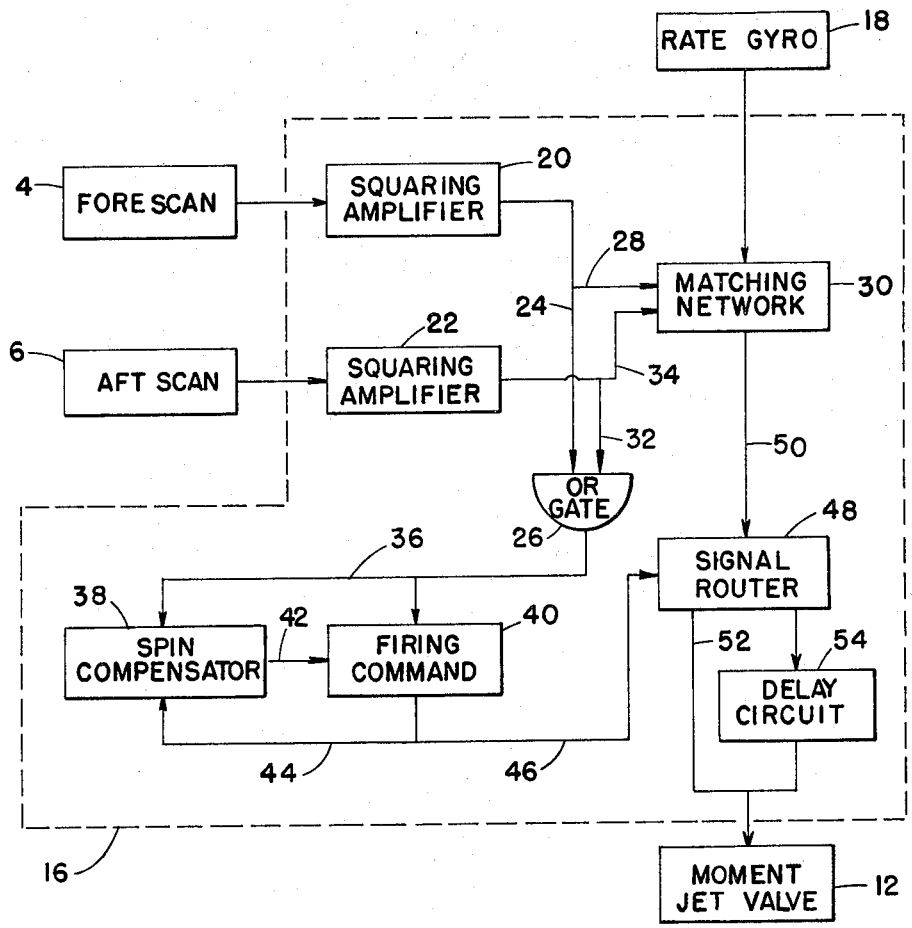

FIG. 2 is a block diagram of the logic circuit 16. As shown, forwardly directed scanner 4 supplies signals to a first squaring amplifier 20, while rearwardly directed scanner 6 supplies signals to a similar squaring amplifier 22. Amplifier 20 is connected by conductor 24 to an OR gate 26 and by conductor 28 to a matching network 30. In like manner, amplifier 22 is connected by conductor 32 to OR gate 26 and by conductor 34 to matching network 30. The OR gate 26 passes appropriate signals via conductor 36 to spin compensator 38 and to firing command circuit 40. Spin compensator 38 supplies signals by conductor 42 to firing command circuit 40 applies signals, via conductor 44, to spin compensator 38 and, via conductor 46, to signal routing circuit 48. The rate gyroscope 18 supplies a signal to matching network 30 which, in turn, passes signals by conductors 50 to the signal routing circuit 48. From the signal routing circuit 48, signals are directed to jet control valve 12, either by conductor 52 or through delay circuit 54.

In operation, spin-stabilized vehicles obey gyroscopic principles. Thus, the pitch attitude of vehicle 2 can be controlled by firing jet nozzle 8 to produce yaw thrust in an appropriate direction to cause the vehicle 2 to precess in the desired pitch direction. On the other hand, it has been found that, unless the firing of jet nozzle 8 is limited to certain portions of the coning motion, the coning motion may be increased or undesired yaw or pitch errors may be introduced. To avoid this, the horizon scanners 4 and 6 emit electrical signals which are supplied, respectively, to squaring amplifiers 20 and 22. Amplifier 20 converts the signals from scanner 4 into square waves and applies them to OR gate 26 and matching network 30 simultaneously. Similarly, amplifier 22 converts the signals from scanner 6 into square waves and applies them to OR gate 26 and matching network 30 simultaneously. The OR gate 26 passes the first signal it receives and supplies this signal via conductor 36 to spin compensator 38 and firing command circuit 40.

In order to effect pitch attitude correction without introducing yaw error, it is necessary that the jet nozzle 8 be in a horizontal position when it is fired. The spin compensator 38 and firing command circuit 40 serve to assure that this condition is fulfilled by timing the thrust pulse emitted by firing command circuit 40 to coincide with the midpoint of the signals from scanners 4 and 6. It will be understood that, as the vehicle 2 rotates about its spin axis, the scanners 4 and 6 will emit signals starting as they pass across one horizon, from sky to earth, and ending as they pass across the opposite horizon, from earth to sky. Consequently, the midpoint of these signals will occur when the scanners 4 and 6 are oriented vertically, that is, midway between the horizons. Since the jet nozzle 8 is displaced 90 degrees in roll from the plane of the scanners 4 and 6, timing the firing of jet nozzle 8 to coincide with the midpoint of the signals from scanners 4 and 6 assures that jet nozzle 8 will be in a horizontal position when it is fired. To accomplish this, the firing command circuit 40 determines the duration of the scanner signal passed by OR gate 26 on the first revolution of vehicle 2 about the spin axis, divides this duration in half to determine the midpoint of the scanner signal, and supplies this information to a triggering mechanism which is activated by the leading edge of the scanner signal on the next successive revolution of vehicle 2 and which acts to emit a firing signal of predetermined duration timed so that the midpoint of the firing signal coincides with the anticipated midpoint of the scanner signal. The firing signal is supplied via conductor 46 to the routing circuit 48 and is also supplied via conductor 44 to the spin compensator 38. Spin compensator 38 receives the scanner signal passed by OR gate 26 and integrates it with one sign prior to receipt of the firing signal, and with the opposite sign following receipt of the firing signal. Any residual voltage from this integration is applied via conductor 42 to the triggering mechanism of the firing command circuit 40 to adjust the timing of subsequent firing signals to coincide more precisely with the midpoint of the scanner signal. This assures that the jet nozzle 8 will be in a horizontal position when a firing command is given to provide a pitch attitude correction. Consequently, firing of jet nozzle 8 will cause precession of the vehicle 2 to effect the desired pitch attitude correction without introducing yaw error.

To prevent or reduce coning, matching network 30 compares the scanner signals from amplifiers 20 and 22 and accepts the longer of the two to determine whether "pitch-up" or "pitch-down" correction is needed. At the same time, the signal from rate gyroscope 18 is added to determine whether the vehicle 2 is in a position such that firing of the jet nozzle 8 will increase or decrease the coning motion. If firing will increase the coning motion, matching network 30 supplies a signal, via conductor 50, to signal routing circuit 48 to prevent passage of the firing signal. On the other hand, if firing will decrease the coning motion, matching network 30 supplies a signal to the signal and to indicate whether a "pitch-up" or "pitch-down" correction is needed. When a "pitch-down" correction is called for, signal routing circuit 48 applies a signal directly to the jet nozzle control valve 12, via conductor 52. In contrast, when a "pitch-up" correction is needed, signal routing circuit 48 applies a signal through delay circuit 54 to the jet nozzle control valve 12. Delay circuit 54 delays the firing signal sufficiently to allow the vehicle 2 to rotate 180 degrees about its spin axis. Thus, the logic circuit of the present invention assures that the jet is fired only in a direction which will not introduce undesired attitude errors and, simultaneously, performs a cone damping operation.

Although, as described herein, the jet nozzle 8 is displaced 90 degrees in roll from the plane of the scanners 4 and 6, it will be understood by those skilled in the art that the exact displacement will be varied in accordance with the inertial ratio of the vehicle 2.

Obviously, numerous variations and modifications may be made without departing from the present invention. Accordingly, it should be clearly understood that the form of the present invention described above and shown in the figures of the accompanying drawing is illustrative only and is not intended to limit the scope of the invention.

What is claimed is:

1. An attitude control system for spin-stabilized vehicles comprising:

a pair of reference sensors mounted in said vehicle in co-planar relationship, a radially directed reaction device mounted in said vehicle at a point displaced longitudinally from the center of gravity of said vehicle and displaced in roll from the plane of said sensors for effecting changes in the attitude of said vehicle, firing means for controlling firing of said reaction device to occur when said reaction device is in a predetermined rotational position, a rate gyroscope, and a logic circuit connected to receive signals from each of said sensors and from said gyroscope and supplying signals to said firing means to regulate firing of said reaction device to occur only during intervals which will serve to decrease coning of said vehicle.

2. An attitude control system for spin-stabilized vehicles comprising:

a pair of reference sensors mounted in said vehicle in co-planar relationship, a radially directed reaction device mounted in said vehicle at a point displaced longitudinally from the center of gravity of said vehicle and displaced in roll from the plane of said sensors for effecting changes in the attitude of said vehicle, firing means responsive to signals from said sensors for firing said reaction device only at times which will not introduce undesired changes in the attitude of said vehicle, a rate gyroscope, and means connected to receive signals from said gyroscope and to supply signals to said firing means to permit firing of said reaction device only at times when firing will tend to decrease coning of said vehicle.

3. An attitude control system for spin-stabilized vehicles comprising:

a first reference sensor establishing a first electrical signal indicative of the attitude of said vehicle with respect to a first reference;

a second reference sensor establishing a second electrical signal indicative of the attitude of said vehicle with respect to a second reference;

means mounting said sensors in said vehicle in co-planar relationship;

a radially directed reaction device mounted in said vehicle at a point displaced longitudinally from the center of gravity of said vehicle and displaced in roll from the plane of said sensors for effecting changes in the attitude of said vehicle;

firing means for controlling firing of said reaction device;

an OR circuit connected to receive said first and second electrical signals and to pass only the first received such signal to trigger said firing means;

a rate gyroscope establishing a third electrical signal indicative of the rate of said vehicle;

a matching network connected to receive said first, second, and third electrical signals and to supply a fourth electrical signal to said firing means to permit triggering of said firing means only at times when firing will tend to decrease coning of said vehicle.

4. An attitude control system for spin-stabilized vehicles comprising:

a first reference sensor establishing a first electrical signal indicative of the attitude of said vehicle with respect to a first reference;

a second reference sensor establishing a second electrical signal indicative of the attitude of said vehicle with respect to a second reference;

means mounting said sensors in said vehicle in co-planar relationship;

a radially directed reaction device mounted in said vehicle at a point displaced longitudinally from the center of gravity of said vehicle and displaced in roll from the plane of said sensors for effecting changes in the attitude of said vehicle;

firing means for controlling firing of said reaction device;

an OR circuit connected to receive said first and second electrical signals and to pass only the first received such signal;

a firing command circuit connected to receive the signal passed by said OR circuit and to supply a firing comand signal to said firing means only when said firing means is in a predetermined rotational position;

a spin compensator circuit connected to receive the signal from said OR circuit and said firing command signal and operative to integrate the signal from said OR circuit with one sign prior to receipt of said firing command signal and with the opposite sign following receipt of said firing command signal and to supply any residual voltage from said integration to said firing command circuit to adjust the timing of said firing command circuit;

a rate gyroscope establishing a third electrical signal indicative of the rate of said vehicle;

a matching network connected to receive said first, second, and third electrical signals and operative to compare said first and second signals to determine which is the longer signal and to add said third signal to said longer signal to establish a fourth electrical signal, and means connected to receive said firing command signal and said fourth electrical signal and responsive to said fourth electrical signal to pass said firing command signal to said firing means only at times when firing of said reaction device will decrease coning of said vehicle.

References Cited

UNITED STATES PATENTS

| | | | |
|---|---|---|---|
| 3,180,587 | 4/1965 | Garner et al. | 244—1 |
| 3,189,299 | 6/1965 | Garner et al. | 244—1 |

FERGUS. S. MIDDLETON, *Primary Examiner.*

MILTON BUCHLER, *Examiner.*

B. BELKIN, *Assistant Examiner.*

UNITED STATES PATENT OFFICE
CERTIFICATE OF CORRECTION

Patent No. 3,384,323                  May 21, 1968

Harold D. Gilbert et al.

It is certified that error appears in the above identified patent and that said Letters Patent are hereby corrected as shown below:

Column 3, line 48, after "signal" insert -- routing circuit 48 to allow passage of the firing signal --.

Signed and sealed this 30th day of September 1969.

(SEAL)
Attest:

Edward M. Fletcher, Jr.          WILLIAM E. SCHUYLER, JR.
Attesting Officer                Commissioner of Patents